(12) United States Patent
Hall et al.

(10) Patent No.: US 6,735,945 B1
(45) Date of Patent: May 18, 2004

(54) ELECTRIC TURBOCHARGING SYSTEM

(75) Inventors: Justin Arthur Hall, Kingston-upon-Thames (GB); Hassan Mansir, Maidenhead (GB); Ross Waring, Kingston-upon-Thames (GB)

(73) Assignee: The Turbo Genset Company Limited, West Drayton (GB)

(*) Notice: Subject to any disclaimer, the term of this patent is extended or adjusted under 35 U.S.C. 154(b) by 0 days.

(21) Appl. No.: 10/089,054

(22) PCT Filed: Sep. 25, 2000

(86) PCT No.: PCT/GB00/03667
§ 371 (c)(1),
(2), (4) Date: Jul. 25, 2002

(87) PCT Pub. No.: WO01/21944
PCT Pub. Date: Mar. 29, 2001

(30) Foreign Application Priority Data

Sep. 23, 1999 (GB) .............................. 99225593

(51) Int. Cl.⁷ .................... F02B 33/44; F02B 37/10; F02B 39/10
(52) U.S. Cl. ................... 60/608; 60/607; 123/565
(58) Field of Search .................. 60/607, 608, 618; 123/565

(56) References Cited

U.S. PATENT DOCUMENTS

| 5,605,045 A | | 2/1997 | Halimi et al. | |
|---|---|---|---|---|
| 5,771,695 A | * | 6/1998 | Halimi | 60/608 |
| 5,906,098 A | * | 5/1999 | Woollenweber et al. | 60/608 |
| 6,305,169 B1 | * | 10/2001 | Mallof | 60/608 |
| 6,474,066 B1 | * | 11/2002 | Lin | 60/607 |
| 6,481,205 B2 | * | 11/2002 | Fledersbacher et al. | 60/608 |
| 6,557,347 B1 | * | 5/2003 | Alvarez et al. | 60/608 |
| 6,609,375 B2 | * | 8/2003 | Allen et al. | 60/608 |

FOREIGN PATENT DOCUMENTS

| DE | 2912950 A | | 10/1980 |
|---|---|---|---|
| EP | 0087316 A1 | * | 8/1983 |
| EP | 0304384 A1 | | 2/1989 |
| FR | 2479899 | * | 4/1981 |
| WO | WO 92/21869 | | 12/1992 |
| WO | WO 96/06271 | | 2/1996 |
| WO | WO 98/16728 | | 4/1998 |

* cited by examiner

*Primary Examiner*—Sheldon J. Richter
(74) *Attorney, Agent, or Firm*—David S. Kashman; Gottlieb Rackman & Reisman

(57) ABSTRACT

The present invention relates to a turbocharger and motor assembly, in which the motor (20) is coupled to one side of the turbocharger (10) to provide additional acceleration of the turbocharger rotor (11) at low engine speeds and to reduce the power provided from the exhaust gases at higher speeds.

12 Claims, 1 Drawing Sheet

ELECTRIC TURBOCHARGING SYSTEM

Figure 1:
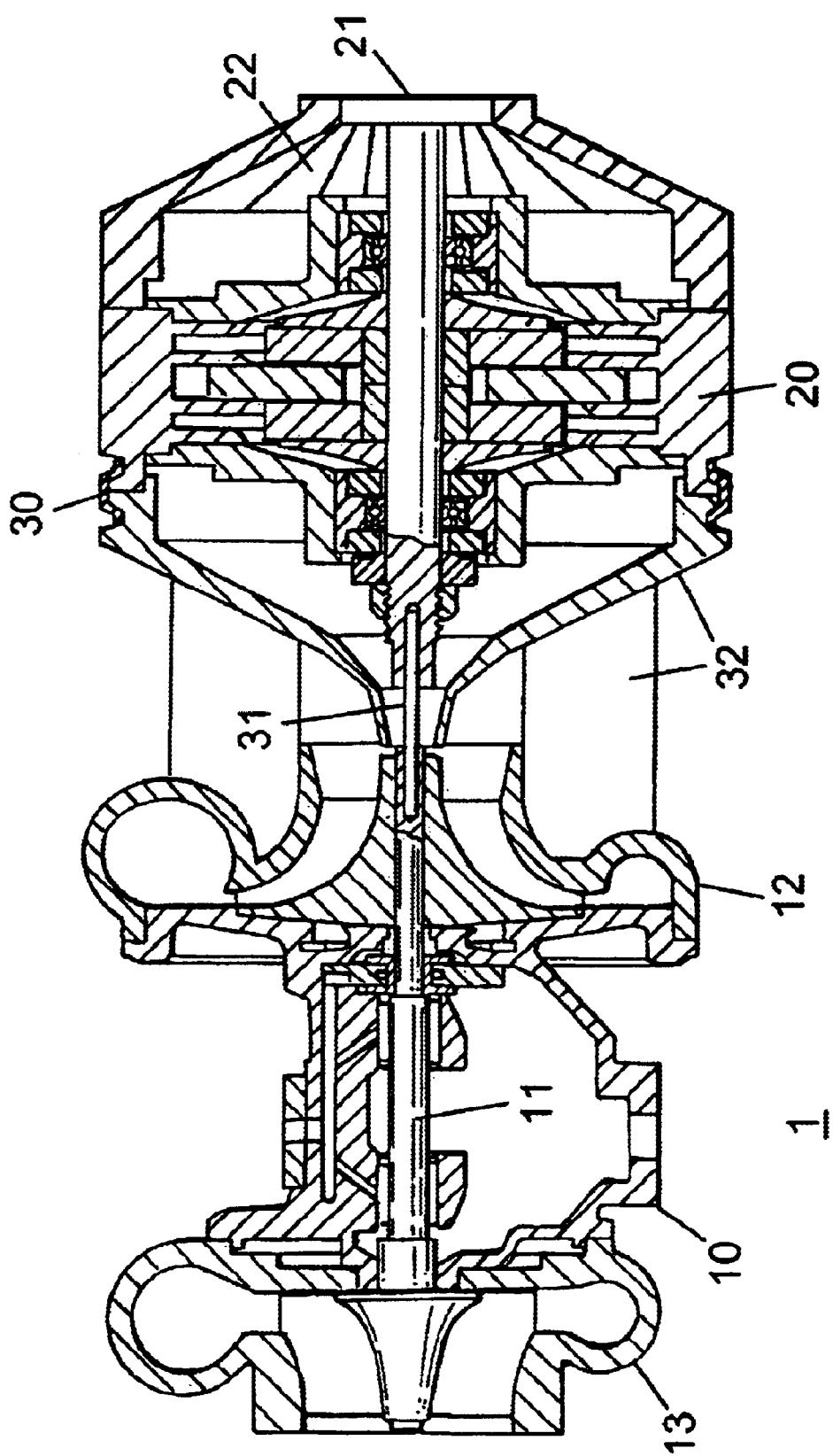

This invention relates to a turbocharger including an electric machine integrat with it.

Internal combustion engines, particularly diesel engines, are commonly turbocharged to enhance performance. The turbocharger utilises energy remaining in the exhaust gases from the engine to drive a turbine which is directly coupled to a compressor. The compressor compresses inlet air which is fed to the intake manifold of the engine to increase the density of the air charge entering the cylinders. In addition, an intercooler is often installed between the compressor and the manifold to remove the heat generated from the compression of the charge air. This reduction in temperature helps to further increase the density and hence the mass of air entering the engine.

The amount of compression of the air provided by the turbocharger is related to the speed of the rotation which in turn is related to the amount of exhaust gas which is dependent upon the speed of the engine. Consequently, at low engine speeds, the turbocharger cannot provide air at a high enough pressure to the engine so that the boost to the engine is lower and the engine does not accelerate very quickly. As the engine and hence the turbocharger speed up, the pressure of the air is increased and the power of the engine is boosted. This delay before the turocharger begins to take effect is known as "turbo lag". The turbo lag can be reduced by increasing the size of the turbine thus providing more power to the compressor at lower speeds. However, at higher engine speeds it is likely that it will become necessary to reduce the turbine power so as to avoid over-speeding the turbocharger and/or over-boosting the engine. This is conventionally achieved with the use of a "wastegate". The wastegate works by bypassing excess exhaust gases past the turbine. The wastegaste is usually controlled by the compressor discharge pressure which provides an indication of the speed of rotation of the turbocharger.

In order to optimise a turbocharger to provide satisfactory performance during steady state operation but also provide adequate transient response, e.g. during acceleration, it is necessary to make a number of compromises. These compromises can result in a reduction in efficiency of the turbocharger and hence the engine, reduced power during steady state operation and poorer aerodynamic efficiency of the turbocharger.

Various ways have been proposed for assisting the turocharger in overcoming its limitations at low engine speed Among these are providing an electric motor which is coupled to the turbocharger to provide additional power to the drive the compressor at low speeds. In addition, at high speeds, the motor can act as a generator to bleed power away from the turbocharger to prevent the turbocharger from over-speeding.

Typically hybrid turbochargers involve integrating an electric motor between the turbine and the compressor wheels which are provided at each end of the turbocharger. However, the motor being in close proximity to the turbine and compressor wheels results in it being subjected to extremes of temperature and thermal cycling. This can lead to a reduction in the insulation life and an increase in the risk of heat soaks which can lead to irreversible losses. In addition, in the prior art it is necessary to provide special bearing arrangements, see U.S. Pat. No. 5,857,332, as well as special provisions for cooling, see U.S. Pat. No. 5,605,045. In addition, these constructions lack the potential for scaling to higher power levels such as those required for heavy duty applications such as in ships and locomotive engines.

Throughout this specification, references to motors include motors which may act as generators.

Therefore, according to the present invention there is provided a turbocharger assembly comprising: a turbocharger and a motor coupled to the turbocharger The present invention provides a turbocharger with a motor assembly which can be easily added to or removed from the turbocharger. The motor is preferably coupled to the turbocharger using a flexible coupling arrangement which provides added integrity and provides for reduced rotor dynamic coupling between the turbocharger and motor shafts. Furthermore, the arrangement of the present invention can easily be retrofitted to existing turbocharger systems with minimal changes to the interfaces. In particular the motor can be attached to the compressor side of the turbocharger without adversely affecting the air induction system so as to minimise any pressure losses at the inlet of the compressor. Furthermore, because of the convenient positioning of the motor assembly, the system is easily accessible and so repair or replacement of parts is much easier resulting in a minimum downtime in case of failure of the motor.

The motor assembly is preferably provided by a permanent magnet axial flux motor. A typical axial flux motor comprises a generally disc-shaped stator mounted between two concentric rotor discs. The stator and the rotor discs each have an opening to receive a central spindle or shaft. A plurality of equi-angularly spaced permanent magnets are mounted, by means of adhesive or otherwise, close to the outer edges of the rotor discs, facing the stator. A side view of an axial flux motor with a rotor disc and magnets is shown in FIG. 1 of the drawings. Cooling airflow is drawn into the machine and is pumped outwards by the rotor. The stator comprises a generally disc-shaped substrate onto which stator windings have been etched in a copper sheet using known techniques. Alternatively the stator may comprise windings embedded in the substrate.

This type of motor provides high-speed capability and high efficiency. As the motor is self-cooled using air, it is capable of being easily adapted to the volume and aspect ratio requirements of a typical turbocharger. This provide a turbocharger assembly which is much more compact and suitable for mounting on existing turbochargers or in spaces limited to the space of a conventional. Furthermore, such motors are available in a broad range of power levels including up to the 100 kW to 250 kW power levels required for ships and locomotive engines.

A specific embodiment of the present invention will now be described by way of example with reference to the accompanying drawing in which:

FIG. 1 shows a section through a high hybrid turbocharger system.

FIG. 1 shows a typical turbocharger 10 coupled to a motor 20. The turbocharger comprises a compressor section 12 and an exhaust turbine section 13. Both the compressor section and the exhaust turbine section include a fan, both of which are mounted on a rotor 11.

The motor 20 is arranged co-axially with the turbocharger 10. The motor is to one side of the turbocharger, in this example on the side on which the compressor section 12 is provided. This helps to minimise heat transferred from the hot exhaust turbine into the motor.

The rotor 11 is linked to a rotor 21 of the motor using a coupling 31. The coupling is required to transfer torque between the rotor 11 in the turbocharger and the rotor 21 in the motor when the motor is acting either as a motor or as a generator. However, to avoid rotor dynamic coupling between the two shafts, the coupling is flexible. This allows the motor and turbocharger rotors to be separate. This allows each having its own separate bearings which are isolated from any vibration in the other. This also allows the two devices to be much more easily taken apart and serviced.

The air intakes and supports 32 are optimised to minimise the pressure losses and also to enhance the performance of the system. The motor section 20 is then mounted to the air inlet supports 32. In the embodiment as shown in FIG. 1, the attachment is via a V-clamp 30. Again this allows the assembly to be easily disassembled for maintenance and servicing.

Due to the passage of exhaust gas through the turbocharger, the compression of inlet and mechanical losses of the high speed rotor, there is considerable heat generated in the turbocharger. By arranging the motor 20 away from the turbocharger section 10, the heat generated in the turbocharger is not easily transferred to the motor. In addition, the motor is self cooled by an internal fan 22. The rejected heat is directed away from the air inlet to the compressor section. This avoids any unnecessary heating of the air entering the compressor.

It is advantageous for the turbocharger to be able to change speed rapidly. Clearly, if the inertia of the turbocharger and motor is high then, unless a large amount of power is applied, the turbocharger will accelerate relatively slowly. Therefore, in order to achieve optimum performance, the inertia of the system should be low. Consequently, the inertia of the motor must not unnecessarily add to the inertia of the turbocharger rotor 11. However, this is not a problem in the present invention where an axial flux machine is used. Such an axial flux machine is provided with a carbon fibre retainment shell and an aluminium alloy spider to support the permanent magnets. As a consequence, the ratio of support structure inertia to magnet inertia is low, providing an optimum balance of inertia of the motor generator rotor 21 to motor performance.

What is claimed is:

1. A turbocharger assembly comprising a turbocharger and a motor coupled to the turbocharger wherein a rotor of the motor is connected to the rotor of the turbocharger by a flexible coupling.

2. A turbocharger assembly according to claim 1 wherein the turbocharger has a compressor portion and a turbine portion at respective axial ends thereof and wherein the motor is coupled to the turbocharger at the end with the compressor portion.

3. A turbocharger assembly according to claim 1 wherein the motor is air cooled.

4. A turbocharger assembly according to claim 1 wherein the motor is an axial flux motor.

5. A turbocharger assembly according to claim 1 wherein the rotors of the motor and turbocharger have their own separate bearings.

6. A turbocharger assembly according to claim 1 or 5 wherein the motor is axially offset from the turbocharger.

7. A turbocharger assembly comprising a turbocharger and a motor coupled to the turbocharger wherein the motor is releasably attached to the turbocharger by a clamp.

8. A turbocharger assembly comprising a turbocharger and a motor coupled to the turbocharger wherein the turbocharger is provided with an air intake for directing air into the turbocharger and the air intake lies between the motor and the turbocharger.

9. A turbocharger assembly comprising a turbocharger and a motor coupled to the turbocharger wherein the turbocharger is provided with an air intake for directing air into the turbocharger and the motor is releasably attached to the air intake.

10. A turbocharger assembly according to claim 9 wherein the motor is releasably attached by a clamp.

11. A turbocharger assembly comprising a turbocharger and a motor coupled to the turbocharger wherein the axial dimension of the motor is smaller than the radial dimension.

12. A turbocharger assembly comprising a turbocharger and a motor coupled to the turbocharger wherein the motor has an integral fan.

* * * * *